June 26, 1962 — D. N. LARKINS — 3,040,765

RELIEF VALVE

Filed Dec. 29, 1960

INVENTOR.
DENNIS N. LARKINS.
BY Max E. Shirk
ATTORNEY.

United States Patent Office 3,040,765
Patented June 26, 1962

3,040,765
RELIEF VALVE
Dennis N. Larkins, Tucson, Ariz.
(Harrodsburg, Ky.)
Filed Dec. 29, 1960, Ser. No. 79,242
3 Claims. (Cl. 137—73)

This invention relates to heat and pressure sensitive relief valves for hot water heaters. More particularly, the invention relates to relief valves which will not only relieve excessive water pressure by permitting water to flow to waste, but will also terminate the fuel supply when the water becomes overheated and simultaneously prevent overheated water from flowing to waste.

Prior art heat and pressure sensitive relief valves permit water to flow to waste both when excessive water pressure is relieved and when the water becomes overheated. Also, such valves do not terminate the fuel supply when the water becomes overheated.

A particular object of the invention is to provide an improved overflow valve for water heaters which is not only heat and pressure sensitive, but which also shuts the fuel supply off when the water becomes overheated.

Another object of the invention is to provide in a relief valve of the type described means for overcoming the bias of a spring of the type used in conventional relief valves when the water in a tank on which the relief valve may be installed becomes overheated.

A further object of the invention is to provide a relief valve of the type described which includes means to prevent water from flowing out a conventional overflow pipe when the water in a tank on which the valve may be used becomes overheated.

A still further object of the invention is to provide a relief valve of the type described which will terminate the fuel supply when the overflow line on a water heater becomes clogged.

These, and other objects and advantges of the invention will become apparent as the description proceeds.

Figure 1:
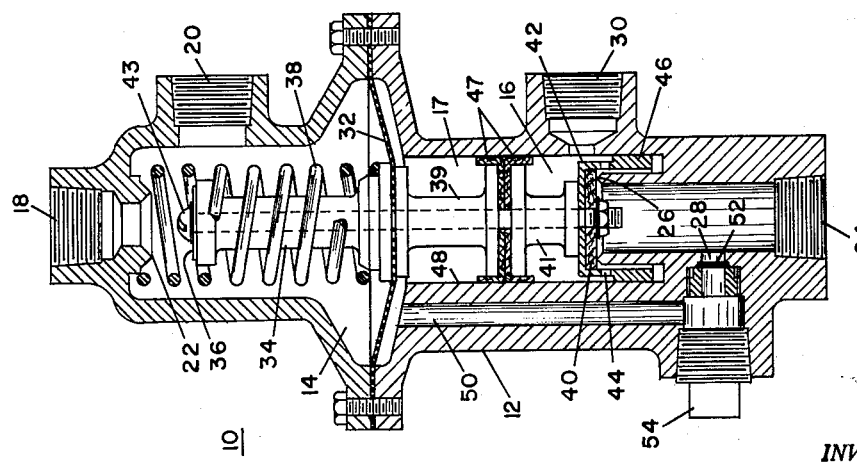
FIG. 1 is a cross-sectional view of a device of my invention showing its parts in one operating position.

Referring to FIG. 1, a relief valve 10 comprises a body portion 12 which includes a gas chamber 14, a water chamber 16 and an intermediate chamber 17. The gas chamber 14 includes a gas inlet port 18 and a gas outlet port 20. A gas-valve seat 22 is mounted in the gas chamber 14 in direct fluid communication with the gas inlet port 18.

The water chamber 16 includes a water inlet port 24, a raised valve seat 26, a first water outlet port 28 and a second water outlet port 30.

A flexible diaphragm 32 separates the gas chamber 14 from the intermediate chamber 17 which, in turn, is separated from the water chamber 16 by a pair of cup-type gaskets 47. A first spool-type spindle 34, including a disc-type gas valve 36, is mounted on the upper side of the diaphragm 32. A compression spring 38 encircles the first spindle 34 and the gas-valve seat 22 so that the gas valve 36 is biased away from the gas-valve seat 22 in a normally open position. This permits free flow of gas from the gas inlet port 18 to the gas outlet port 20 under normal operating conditions.

A second spool-type spindle 39 carries the cup-type gaskets 47 and is mounted on the lower side of the diaphragm 32. A third spool-type spindle 41 carries a cylindrical skirt 42 which includes a disc-type water valve 40. A bolt 43 holds the spindles 34, 39 and 41 together. The spring 38 maintains the water valve 40 in a normally closed position.

The cylindrical skirt 42 includes a plurality of water outlet ports 44, which are placed closely subjacent the water valve 40, and an annular gate 46 which is adapted to close the second water outlet port 30 under conditions to be hereinafter described. The cup-type gaskets 47 bear against the wall 48 which is common to the water chamber 16 and the intermediate chamber 17.

A passageway 50 places the intermediate chamber 17 and the water chamber 16 in hydraulic communication through the port 28. The port 28 is normally closed by a fusible plug 52. The fusible plug 52 may be inserted through an opening in the wall of the water chamber 16 by removing an access plug 54.

The relief valve 10 may be placed in hydraulic communication with a water heater, not shown, through the water inlet port 24. The gas inlet port 18 is connected to the main gas supply which normally serves the water heater and the gas outlet port 20 is connected to the inlet side of a conventional gas control unit which may be used to control the supply of fuel to the water heater.

Figure 2:
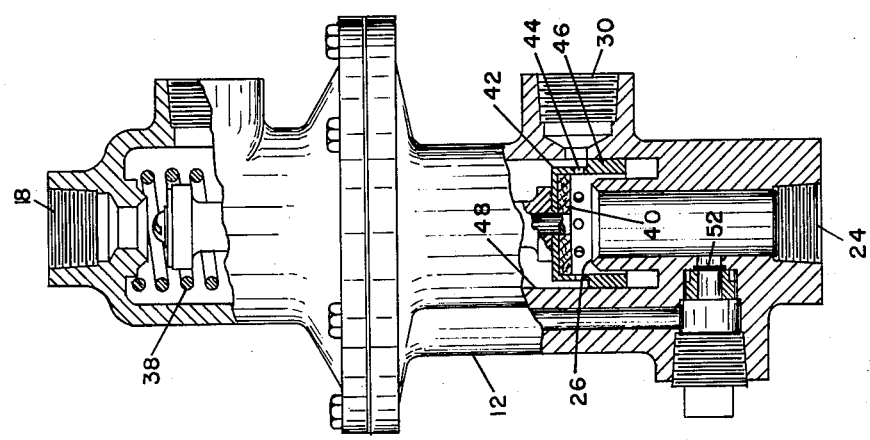
FIG. 2 is an elevational view of the device of FIG. 1 with portions shown in cross-section to illustrate a second operating position of certain parts of the device.

Operation of the device will be readily understood. The area of the water valve 40 is correlated with the tension of the spring 38 so that excessive water pressure will unseat the valve 40 placing the water outlet ports 44 in hydraulic communication with the water outlet port 30. This position of the valve 40 is shown in FIG. 2 where it is noted that the valve 40 is unseated only sufficiently to permit water to flow to waste through port 30, but not enough to also seat gas valve 36.

Figure 3:
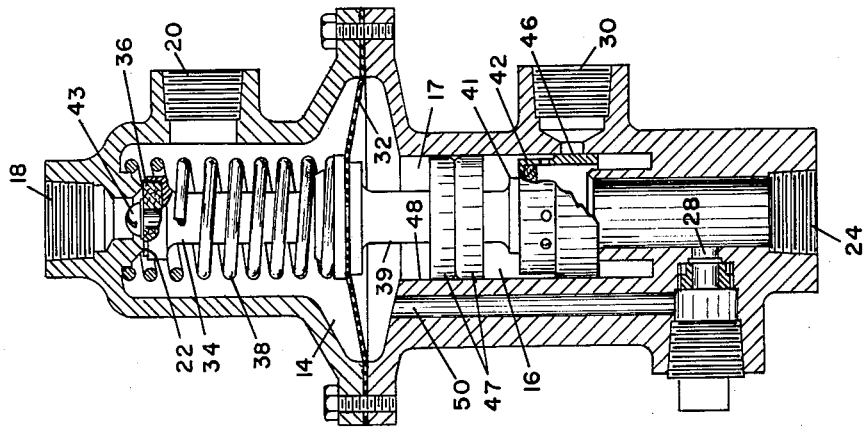
FIG. 3 is a cross-sectional view of the device of FIG. 1 showing its parts in a third operating position.

Referring to FIG. 3, it is noted that the gas valve 36 is seated so that the gas supply will be shut off. It is also noted that the gate 46 has closed the water outlet port 30. This condition is brought about because excessive temperature of the water in the water heater has melted the fusible plug 52 permitting water to flow through passageway 50 to the underside of the diaphragm 32. Since the area of the diaphragm is approximately three times the area of valve 40, ordinary water pressure which will not overcome the bias of spring 38 when acting on valve 40, will overcome it when acting on the diaphragm 32. This snaps the diaphragm upwardly seating the gas valve 36 and the gate 46. I prefer to close the outlet port 30 when the water becomes overheated so hot water will not discharge to waste thereby lowering the pressure inside the water tank and making it possible for the contents of the tank to flash into steam.

Should the port 30 become clogged and, while this condition prevails, excessive water pressure unseats the valve 40, dangerous pressures could develop within the water tank; however, this pressure will also bear against the top of spindle 41 and the underside of one cup-type gasket 47. This pressure will force the gas valve 36 upwardly and terminate the fuel supply indicating that some undesirable condition exists.

It will be clear to those skilled in the art that the device of the present invention provides a compact and efficient mechanism for minimizing the danger of water heaters exploding due to excessive pressures. It is especially useful in those situations where the mechanisms controlling supply of fuel to water heaters malfunction.

It should also be understood that certain features of the invention may be used in other combinations than those illustrated, as provided for in the appended claims. For example, while in the embodiment shown in the drawings the device has been illustrated as being employed with gas fired water heaters, it will be obvious that a normally closed electric switch may be mounted in the port 18 for use on electric water heaters. In this case, the port 20 will be closed with a plug. The button of such a switch could extend down into the port 18 sufficiently to permit bolt 43 to depress the button opening the electrical circuit supplying current to the water heater.

According to the provisions of the patent statutes, I have illustrated and described what I now consider to represent its best embodiment. However, I desire to have it understood that, within the scope of the appended claims, the invention may be practiced otherwise than as specifically illustrated and described.

I claim:
1. A relief valve for water heaters, comprising:
a body portion including a gas chamber, an intermediate chamber and a water chamber;
valved gas port means mounted in said gas chamber for controlling flow of gas therethrough;
a flexible diaphragm mounted in said body portion for separating said gas chamber from said intermediate chamber;
gasket means mounted in said body portion for preventing hydraulic communication between said intermediate chamber and said water chamber;
means mounted on the upper side of said diaphragm for controlling operation of said valved gas port means including preventing flow of gas through said gas chamber when said diaphragm is flexed to a first position;
valved water port means mounted in said water chamber for controlling flow of water therethrough and being adapted to prevent flow of water when said diaphragm is flexed to a second position;
means mounted on the underside of said diaphragm for controlling operation of said valved water port means;
spring means normally maintaining said diaphragm in its second position;
a passageway placing said valved water port means in hydraulic communication with said intermediate chamber;
and heat sensitive means normally closing said passageway.

2. A relief valve for water heaters, comprising:
a body portion including a fuel chamber, an intermediate chamber and a water chamber;
valved fuel port means mounted in said fuel chamber for controlling flow of fuel therethrough;
a flexible diaphragm mounted in said body portion for separating said fuel chamber from said intermediate chamber;
means mounted on the upper side of said diaphragm for controlling operation of said valved fuel port means by preventing flow of fuel through said fuel chamber when said diaphragm is flexed to a first position;
a water-inlet port and a water-outlet port mounted in said water chamber;
a valve mounted on the underside of said diaphragm;
a valve seat mounted in said water chamber intermediate said water inlet and outlet ports;
said valve being adapted to seat on said valve seat when said diaphragm is flexed to a second position;
spring means maintaining said valve in a normally seated position;
gasket means mounted on the underside of said diaphragm superjacent said valve for preventing hydraulic communication between said water chamber and said intermediate chamber;
a passageway placing said water inlet port in hydraulic communication with said intermediate chamber;
and heat sensitive means normally closing said passageway.

3. A relief valve for water heaters, comprising:
a body portion including a gas chamber, an intermediate chamber subjacent said gas chamber and a water chamber subjacent said intermediate chamber;
said gas chamber including gas inlet and outlet ports;
a gas-valve seat mounted in said gas chamber intermediate said gas ports;
said water chamber including water inlet and outlet ports;
a water-valve seat mounted in said water chamber intermediate said water ports;
a flexible diaphragm separating said gas chamber from said intermediate chamber;
a first spindle including a gas valve mounted on said diaphragm in such a manner that said gas valve will seat on said gas-valve seat when said diaphragm is flexed to a first position;
a second spindle including a water valve, a gasket and a cylindrical skirt mounted on said diaphragm in such a manner that said water valve will seat on said water-valve seat when said diaphragm is flexed to a second position and that said gasket prevents hydraulic communication between said water chamber and said intermediate chamber;
spring means normally maintaining said diaphragm in its second position;
said cylindrical skirt including apertures immediately subjacent said water valve and an annular gate subjacent said apertures;
said apertures placing said water inlet port in hydraulic communication with said water outlet port when said diaphragm is flexed to a third position by excessive water pressure overcoming the bias of said spring means;
said annular gate being adapted to close said water outlet port when said diaphragm is flexed to said first position;
a passageway mounted in said body portion for placing said water inlet port in hydraulic communication with said intermediate chamber;
and a fusible plug normally closing said passageway;
said diaphragm being adapted to flex to said first position when hot water melts said fusible plug and flows from said water inlet port to said intermediate chamber.

References Cited in the file of this patent
UNITED STATES PATENTS

| | | |
|---|---|---|
| 1,586,757 | Maitland | June 1, 1926 |
| 1,723,567 | Lovekin | Aug. 6, 1929 |